(12) United States Patent
Sone et al.

(10) Patent No.: US 9,174,542 B2
(45) Date of Patent: Nov. 3, 2015

(54) POWER SUPPLY DEVICE FOR VEHICLE

(75) Inventors: Mitsuo Sone, Chiyoda-ku (JP);
Nobuhiro Kihara, Chiyoda-ku (JP);
Fumito Uemura, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 898 days.

(21) Appl. No.: 13/113,709

(22) Filed: May 23, 2011

(65) Prior Publication Data

US 2012/0119574 A1 May 17, 2012

(30) Foreign Application Priority Data

Nov. 15, 2010 (JP) .................................. 2010-254764

(51) Int. Cl.
*B60L 11/00* (2006.01)
*B60L 11/12* (2006.01)

(52) U.S. Cl.
CPC ............. *B60L 11/005* (2013.01); *B60L 11/126* (2013.01); *B60L 2240/445* (2013.01); *Y02T 10/6217* (2013.01); *Y02T 10/7005* (2013.01); *Y02T 10/7022* (2013.01); *Y02T 10/7077* (2013.01)

(58) Field of Classification Search
CPC ........................................................ B60L 1/00
USPC ........................................................ 307/10.1
See application file for complete search history.

(56) References Cited

U.S. PATENT DOCUMENTS

| 6,069,804 A * | 5/2000 | Ingman et al. ............. 363/21.14 |
| 8,339,104 B2 * | 12/2012 | Tamura ......................... 320/136 |
| 8,571,734 B2 * | 10/2013 | Yamamoto et al. ............. 701/22 |
| 2006/0097579 A1 * | 5/2006 | Okuda et al. ................... 307/103 |
| 2006/0273806 A1 * | 12/2006 | Kirchner et al. .............. 324/686 |
| 2007/0285048 A1 * | 12/2007 | Leach et al. ................... 320/101 |
| 2009/0134851 A1 * | 5/2009 | Takeda et al. ................. 323/234 |
| 2010/0087976 A1 * | 4/2010 | Aridome et al. ................ 701/22 |
| 2010/0308659 A1 * | 12/2010 | Morita et al. ................... 307/66 |
| 2011/0087393 A1 * | 4/2011 | Verbrugge et al. ............. 701/22 |

FOREIGN PATENT DOCUMENTS

| JP | 2005-218285 A | 8/2005 |
| JP | 2007-124771 A | 5/2007 |

(Continued)

OTHER PUBLICATIONS

Japanese Office Action, dated Oct. 2, 2012, issued in corresponding Japanese Application No. 2010-254764.

*Primary Examiner* — Rexford Barnie
*Assistant Examiner* — Daniel Kessie
(74) *Attorney, Agent, or Firm* — Sughrue Mion, PLLC; Richard C. Turner

(57) ABSTRACT

The invention has an object of providing a power supply device for vehicle of high efficiency while keeping longer service life of a capacitor. By supplying an electric power of a capacitor to various electronic devices for a first predetermined time period after a vehicle engine has been stopped and discharging an electric power of the capacitor to a battery for a second predetermined time period after the first predetermined time period has ended, the voltage of the capacitor is reduced. By forcing the electric power of the capacitor to discharge at a forced discharge circuit until the voltage of the capacitor is substantially equal to a predetermined voltage after the second predetermined time period has ended, the time period during which the capacitor is held at a high voltage is made shorter. Longer service life of the capacitor and higher efficiency of the power supply device can be achieved.

14 Claims, 3 Drawing Sheets

(56) References Cited

FOREIGN PATENT DOCUMENTS

| JP | 2008-054363 A | 3/2008 |
| JP | 2009-078744 A | 4/2009 |
| JP | 2009078744 A * | 4/2009 |

* cited by examiner

POWER SUPPLY DEVICE FOR VEHICLE

BACKGROUND OF THE INVENTION

1. Field of the Invention

The present invention relates to a power supply device for vehicle and, more particularly, to a power supply device for vehicle using a capacitor in combination.

2. Description of the Prior Art

It is a recent trend that, to be friendly to environments or to improve fuel efficiency, automobiles having an idling-stop function to stop the operation of engine on the occasion of making a stop or an electric power steering for reducing an engine load are commercially available. Further, a hybrid system for positively assisting engine drive is assumed to come into wide use in the future. Furthermore, as to the braking of vehicles, e.g., a regenerative brake system to recover an electric energy from a braking energy is practically utilized.

As described above, although an electric power that automobiles require tends to increase from now on, a problem exits in that a secondary battery cannot sufficiently be charged with an instantaneous electric power in such a manner as in the braking time of vehicles. To meet this, an arrangement of adding in an auxiliary manner a capacitor having a large capacity, typified by an electric double-layer capacitor capable of performing rapid charge and discharge, has been proposed. However, a problem exits in shorter service life of the capacitor in case that the capacitor is left in the state of high voltages close to its rated voltage.

On the other hand, for example, a power supply device for vehicle achieving longer service life of a capacitor was proposed in the Japanese Patent Publication (unexamined) No. 124771/2007.

In this power supply device of the Japanese Patent Publication (unexamined) No. 124771/2007, improvement in service life is achieved by discharging an electric power of a capacitor until its voltage is substantially equal to the voltage of a battery on the occasion when the ignition switch of a vehicle is turned off. In this case, an electric power having been stored in the capacitor is discharged to the battery and the battery is charged.

However, in the power supply device for vehicles incorporating the above-mentioned regenerative brake system, since a regenerative energy is charged by the regenerative brake system at the time of making a stop, the battery is likely to be in the full-charge state as described above.

SUMMARY OF THE INVENTION

It is certain that owing that the time period, during which the capacitor is left in the state of high voltage, is surely shortened, such a power supply device as mentioned above provides improvement in service life. However, in the case that the battery is in the full-charge state on the occasion when the ignition switch of a vehicle is turned off, that is, the vehicle engine is stopped, the electric power having been stored in the capacitor results in wasted consumption. Moreover, the engine is quite likely to be restarted for a while after the engine has been stopped, and the capacitor will be charged again immediately after its discharge.

Accordingly, in the conventional power supply device, since the electric power having been stored in the capacitor often results in wasted consumption, a problem exists in large loss and low efficiency as a power supply device and a vehicle on the whole.

The present invention has an object of providing a power supply device for vehicle in which an electric power having been stored in a capacitor can be effectively consumed on the occasion of restarting the vehicle engine without wasted consumption.

Besides, the invention has a further object of providing a power supply device for vehicle of high efficiency while achieving longer service life of a capacitor.

To solve the above-described conventional problems, a power supply device for vehicle according to the invention controls a DC/DC convertor so that an electric power having been stored in a capacitor may be supplied to various electronic devices in the case that a voltage of the mentioned capacitor is not less than a predetermined voltage for a first predetermined time period after the operation of the vehicle engine has been stopped, and controls the mentioned DC/DC convertor so that the electric power having been stored in the mentioned capacitor may be supplied to the mentioned battery in the case that the voltage of mentioned capacitor is not less than a predetermined voltage for a second predetermined time period after the mentioned first predetermined time period has passed.

In the power supply device for vehicle according to the invention, due to that the voltage of the capacitor is reduced to substantially near the predetermined voltage after a predetermined time period has passed after the stop of the vehicle engine without immediate forced discharge on the occasion when the vehicle engine is stopped, the energy having been stored in the capacitor at the time when the vehicle engine is stopped can be effectively consumed, thus enabling to obtain higher efficiency of the power supply device for vehicle while achieving longer service life of a capacitor.

The foregoing and other objects, features, aspects and advantages of the present invention will become more apparent from the following detailed description of the present invention when taken in conjunction with the accompanying drawings.

DETAILED DESCRIPTION OF THE INVENTION

Embodiment 1

Figure 1:
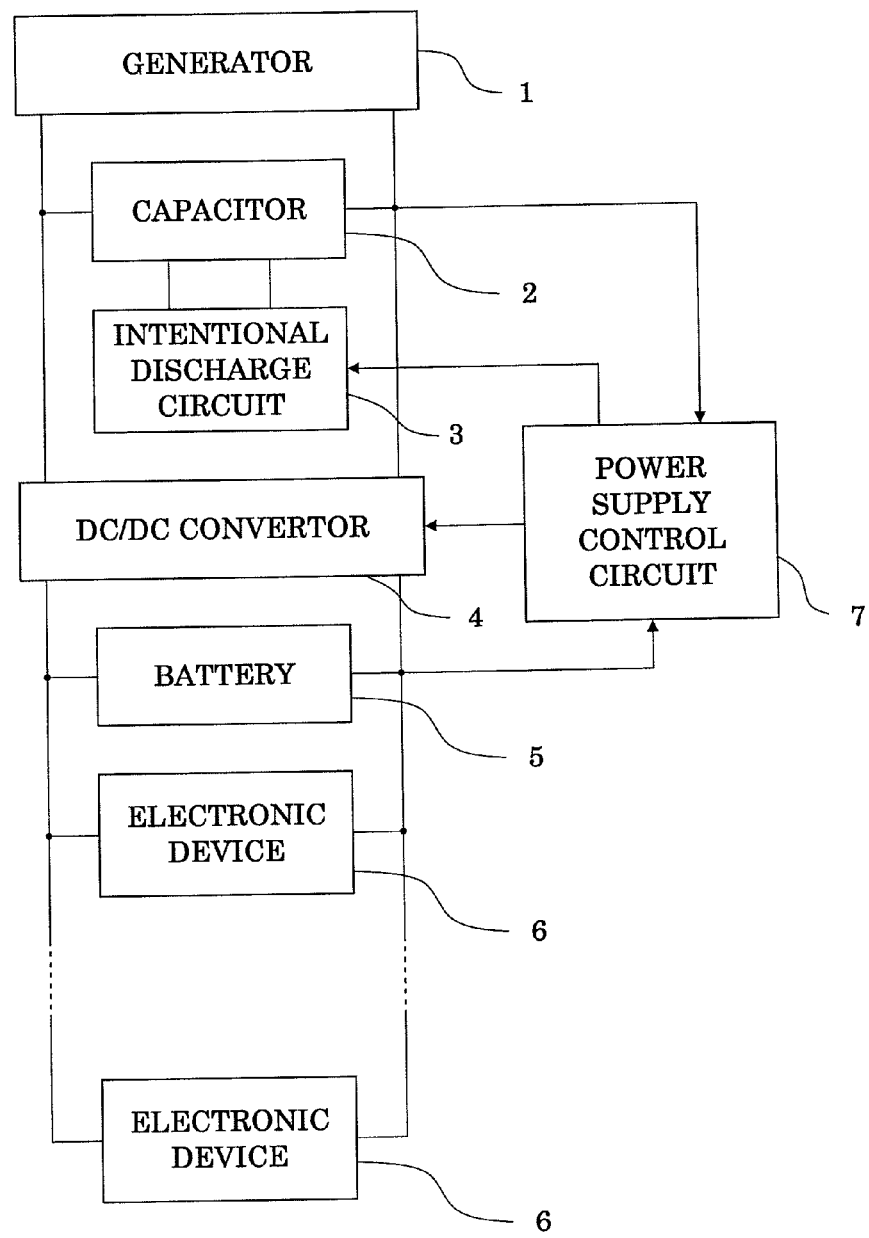
FIG. 1 is a block diagram illustrating an entire arrangement of a power supply device for vehicle according to the present invention.

A power supply device for vehicle according to a first preferred embodiment of the present invention is hereinafter described referring to the drawings.

Figure 2:
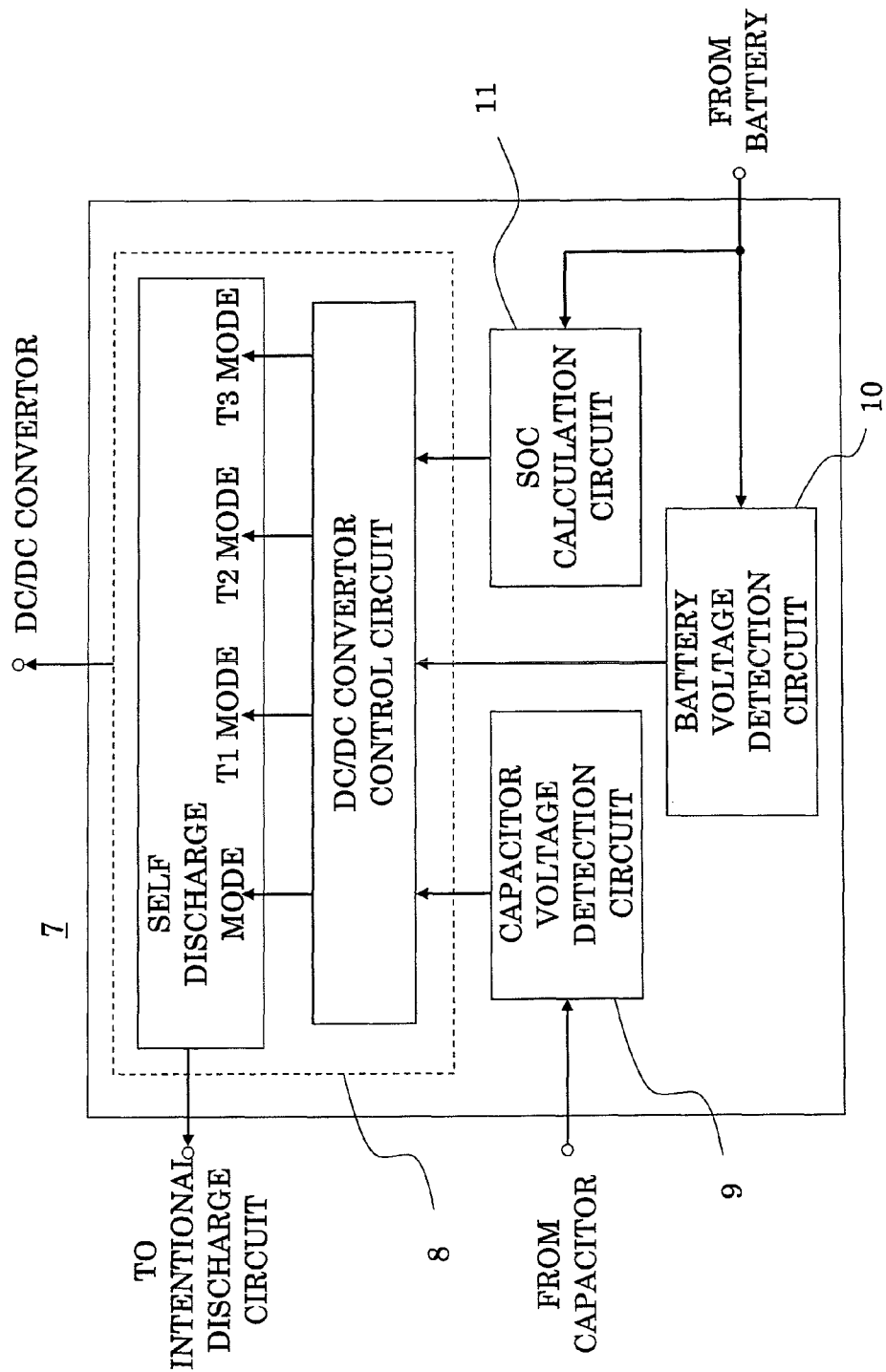
FIG. 2 is a block diagram illustrating an internal arrangement of a power supply control circuit according to a first preferred embodiment of the present invention.

FIG. 1 is a block diagram illustrating an entire arrangement of the power supply device for vehicle, and FIG. 2 is a block diagram illustrating an internal arrangement of the power supply control circuit thereof.

A power supply device for vehicle in FIG. 1 includes: a generator 1; a capacitor 2 connected to both terminals of the generator 1; a forced discharge circuit 3 forcing an electric power having been stored in the capacitor 2 to discharge; a DC/DC convertor 4 connected in parallel with the capacitor 2; a battery 5 connected in parallel with the DC/DC convertor 4; a load 6 formed of various electronic devices connected to the battery 5; and a power supply control circuit 7 acting to monitor the voltage of the capacitor 2 and the battery 5 and to control the operation of the DC/DC convertor 4 and the forced discharge circuit 3.

Referring to FIG. 2, the power supply control circuit 7 of FIG. 1 includes: a capacitor voltage detection circuit 9 detecting the voltage of the capacitor 2; a battery voltage detection circuit 10 detecting the voltage of a battery; an SOC calculation circuit 11 calculating the remaining amount of the battery letting the full charge of the battery 5 100% that is the charged state (SOC (State of Charge)) of the battery based on battery voltage, current and the like; and a DC/DC convertor control circuit 8 controlling the DC/DC convertor 4 in response to a signal from the capacitor voltage detection circuit 9, the battery voltage detection circuit 10 and the SOC calculation circuit 11.

Figure 3:
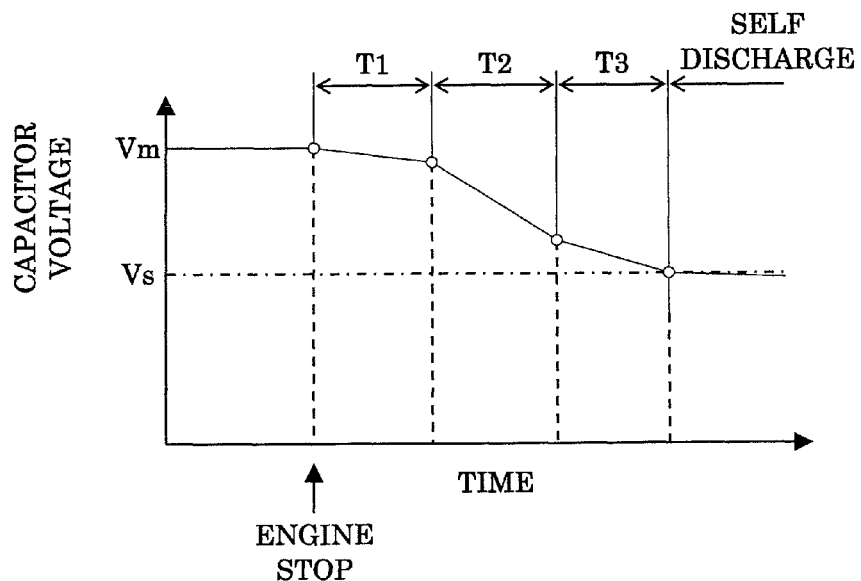
FIG. 3 is a graph illustrating time courses of a capacitor voltage after the vehicle engine has been stopped.
Figure 4:
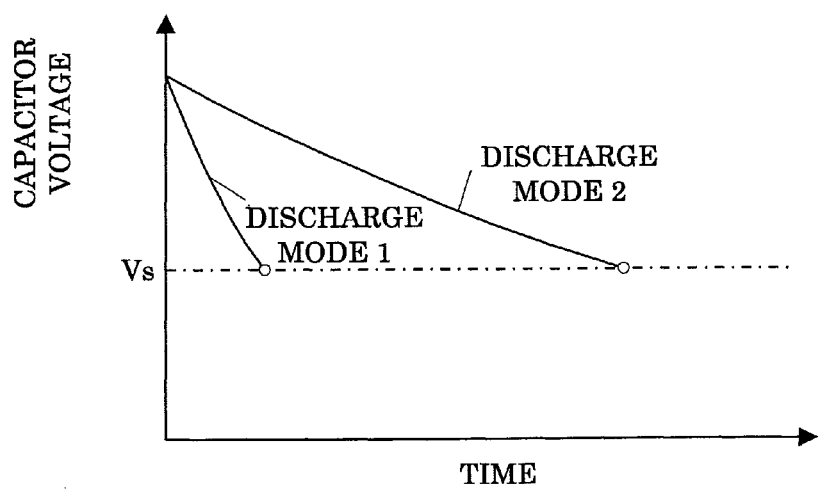
FIG. 4 is a graph illustrating time courses of a capacitor voltage according to another control mode being a modification of FIG. 3.

Now, detailed operations in the first embodiment according to the invention are described with reference to FIGS. 3 and 4. FIG. 3 illustrates time courses of a capacitor voltage after the vehicle engine has been stopped, for example, an ignition has been turned off. First, a first predetermined time period after the vehicle engine has been stopped is a predetermined period T1, a subsequent second predetermined time period after the above-mentioned period T1 has ended is a predetermined period T2, and a third predetermined time period after the period T2 has ended is a predetermined period T3.

Referring to FIG. 3, for the predetermined period T1 after the vehicle engine has been stopped, in the case that the voltage of the capacitor 2 is not less than a predetermined voltage Vs, the power supply control circuit 7 controls the DC/DC convertor 4 at the DC/DC convertor control circuit 8 so as to cause the voltage of the battery 5 to be a constant voltage, thereby making such a control that an electric power having been stored in the capacitor 2 is supplied to various electronic devices 6 (T1 mode).

Since the vehicle engine is likely to be restarted for a while after the vehicle engine has been stopped, the electric power having been stored in the capacitor 2 is used only for the consumption at the electronic devices 6 for the predetermined time period T1. Therefore, the energy having been stored in the capacitor 2 is not wasted, thus enabling to obtain a highly efficient power supply device for vehicle.

Furthermore, in the case that the voltage of the capacitor 2 is substantially equal to or less than the predetermined voltage Vs in the period T1, the power supply control circuit 7 stops the operation of the DC/DC convertor 4 and the capacitor 2 is brought in spontaneous discharge.

Next, in the case that the voltage of the capacitor 2 is not less than the predetermined voltage Vs for the predetermined period T2 after the period T1 has ended, the power supply control circuit 7 controls the DC/DC convertor 4 so that an electric power having been stored in the capacitor 2 may be supplied to the battery 5, which may be charged (T2 mode).

In addition, in the above-described first embodiment, by the combination of the later-described controls 1) to 3) in the practical operation, further improvements in efficiency of the power supply device according to this invention can be achieved and the deterioration of the capacitor or battery can be suppressed.

1) During operation of the vehicle engine and for a time period from the stop of the vehicle engine until the period T1 elapses, the charged state of the battery 5 has preliminarily been made to be rather low, that is, the SOC thereof has preliminarily been set to be lower by several % to several tens %, thereby enabling to increase the amount of an electric power that can be stored in the battery 5 during the period T2. That is, since the battery 5 can be charged with more energy having been stored in the capacitor 2, the voltage of the capacitor 2 can be decreased without the waste of energy.

2) On the occasion of charging the battery 5 with an electric power having been stored in the capacitor 2 for the period T2, by causing the output current from the DC/DC convertor 4 to be larger, the voltage of the capacitor 2 is rapidly decreased and the time period when the capacitor 2 is held at a high voltage is reduced. Thus, the deterioration of the capacitor 2 can be suppressed to a minimum. The discharge mode 1 of FIG. 4 illustrates this state.

The output current in the above-mentioned discharge mode 1 is determined in consideration of the maximum rated current of the capacitor 2, the maximum rated current of the DC/DC convertor 4 and the maximum rated current of the battery 5. In general, since the maximum rated current of the battery 5 is dominant, the maximum rated current is desirable to be within a value of the maximum rated current of the battery.

3) Besides, on the occasion of charging the battery 5 with an electric power having been stored in the capacitor 2, by reducing the output current from the DC/DC convertor 4 as well as setting a longer period T2, the energy to be consumed by the internal resistance of the capacitor 2 and the internal resistance of the battery 5 can be decreased. Thus, the battery 5 can be charged with an electric power having been stored in the capacitor 2 more effectively. This state is illustrated in the discharge mode 2 of FIG. 4.

The output current in the discharge mode 2 is determined taking the conversion efficiency of each output current from the DC/DC convertor 4 and the charge efficiency of the battery 5 into consideration. For example, in the case that the output current is reduced, due to the conversion efficiency of each output current from the DC/DC convertor, the input current comes to be significantly decreased. Thus, it is desirable that the output current is determined in consideration of the efficiency of the DC/DC convertor.

Further, in the case that the voltage of the capacitor 2 is substantially equal to or less than a predetermined voltage Vs in the period T2, the power supply control circuit 7 stops the operation of the DC/DC convertor 4 and the capacitor 2 is brought in the spontaneous discharge (self-discharge) mode. In addition, during operation of the vehicle engine and for a time period from the stop of the vehicle engine until the period T1 elapses, by controlling the DC/DC convertor 4 so that the voltage of the battery 5 may be low as compared with that in the period T2, the battery 5 can be charged with more energy having been stored in the capacitor 2 without the use of any battery sensor.

Next, for a predetermined period T3 after the period T2 has ended, in the case that the voltage of the capacitor 2 is not less than a predetermined voltage Vs, at the forced discharge circuit 3 provided at the capacitor 2, an electric power of the capacitor 2 is forced to discharge using the forced discharge circuit 3 until the voltage of the capacitor 2 comes to be the predetermined voltage Vs. Thus, in the case that the vehicle engine is not restarted even if a predetermined period T2 has passed, since a vehicle is quite likely to be stopped for a comparatively long time period, the voltage of the capacitor 2 is decreased gradually by the spontaneous discharge of the capacitor 2 and becomes lower than the predetermine voltage Vs sooner or later. Whereas, the time period during which the capacitor 2 is held at a high voltage can be reduced by forcing an electric power having been stored in the capacitor 2 to discharge using the forced discharge circuit 3, thus enabling to minimize the deterioration of the capacitor 2.

Embodiment 2

In the foregoing first embodiment, the predetermined period after the vehicle engine has been stopped is assumed to be T1; whereas by monitoring whether or not the voltage of the capacitor 2 is varied, that is, whether or not the charge operation or discharge operation of the capacitor 2 is conducted at the power supply control circuit 7, a state of no charge-discharge operation can be determined to be the stop of operation. By letting a predetermined period after the above-mentioned determination T1, the vehicle engine needs not to be externally stopped, that is, the OFF signal of the ignition switch of the vehicle needs not to be inputted, thus enabling to reduce the number of external input terminals of the power supply control circuit 7.

Embodiment 3

Furthermore, in this third embodiment, by the provision of a temperature sensor, temperature rise of a cooling water of the vehicle is determined to be the operation start of the engine, and the drop of water temperature to a predetermined temperature is determined to be the lapse of a predetermined time period from the operation stop of the engine. In the first and second embodiments, a microcomputer forms the power supply control circuit 7 illustrated in FIG. 2 and the time lapse is counted using this microcomputer; whereas in this third embodiment, the time lapse is not counted using a microcomputer, but it is set such that the time point at which a water temperature drops to a predetermined temperature is regarded as when a predetermined time period has passed from the stop of operation, and the discharge to a battery is conducted. Accordingly, the function of monitoring the charge or discharge time period of the capacitor 2 can be simplified, thus enabling to obtain a more simple circuit arrangement.

Additionally, although an example of the provision of the forced discharge circuit 3 at the capacitor 2 is described in the foregoing first embodiment, the same effect can be obtained even in the case of the provision of the forced discharge circuit 3 at the DC/DC convertor 4.

Furthermore, by providing a radiator at the DC/DC convertor 4 and connecting the forced discharge circuit 3 to the DC/DC convertor 4, the above-mentioned radiator functions to perform heat radiation of both generated heat of the DC/DC convertor 4 and generated heat of the forced discharge circuit 3. Since the DC/DC convertor 4 is in the OFF state for a predetermined period T3, the radiator of the DC/DC convertor 4 also functions as the radiator of the forced discharge circuit as it is with its size. Therefore, the space of radiator can be reduced.

By the above-described arrangement, due to that the voltage of the capacitor 2 is made lower than the predetermined voltage Vs after a predetermined time period has passed, the energy having been stored in the capacitor 2 can be effectively consumed at the time of making a stop. Consequently, a highly efficient power supply device for vehicle can be obtained while achieving the longer service life of the capacitor.

In the first embodiment, an example of using a step-down DC/DC convertor is described, and likewise with any of a step-up DC/DC convertor, a step-up/down DC/DC convertor and a bidirectional DC/DC convertor, an example of connecting the generator 1 to the terminal side of the capacitor 2 is given. However, the same advantage can be obtained even in the case of connecting the generator 1 to the terminal side of the battery 5.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A power supply device for vehicle comprising:
   a capacitor;
   a DC/DC convertor connected to said capacitor;
   a battery connected to said DC/DC convertor;
   a load connected to said battery; and
   a power supply control circuit that monitors a voltage of said capacitor and battery and controls operation of said DC/DC convertor, and is provided with a first operational mode, a second operational mode, and a third operational mode,
   wherein said power supply control circuit is configured to operate in the first operational mode and control so that an electric power having been stored in said capacitor is supplied to said load in response to the voltage of said capacitor being not less than a predetermined voltage for a first predetermined time period T1 after operation of a vehicle engine has been stopped, to operate in the second operational mode immediately after the first predetermined time period T1 lapses and control so that the electric power having been stored in said capacitor is supplied to said battery in response to the vehicle engine remaining stopped and the voltage of said capacitor remaining not less than the predetermined voltage for a second predetermined time period T2, and to operate in the third operational mode immediately after the second predetermined time period T2 lapses and control so as to force the capacitor to discharge the stored electric power, for a third predetermined time period T3, in response to the vehicle engine being stopped and the voltage of the capacitor being not less than the predetermined voltage, and
   wherein the power supply control circuit includes:
   a capacitor voltage detection circuit configured to detect the voltage of the capacitor;
   a battery voltage detection circuit configured to detect a battery voltage;
   a state of charge (SOC) calculation circuit configured to calculate a charged state of the battery; and
   a DC/DC convertor control circuit configured to control the DC/DC convertor in response to a signal from the capacitor voltage detection circuit, battery voltage detection circuit and SOC calculation circuit.

2. The power supply device for vehicle according to claim 1, wherein said DC/DC convertor is controlled so that the voltage of the battery at the time of operation of the vehicle engine and for a time period from the stop of the vehicle engine until the first predetermined time period T1 elapses is made lower than the voltage of the battery during the second predetermined time period T2.

3. The power supply device for vehicle according to claim 1, wherein the operation stop of said engine is determined by OFF of ignition.

4. The power supply device for vehicle according to claim 1, wherein the operation stop of said engine is determined by no charge-discharge operation of the capacitor.

5. The power supply device for vehicle according to claim 1, wherein the operation stop of said engine is determined, through monitoring a temperature sensor of cooling water of the vehicle, by the drop of the water temperature having once risen to not more than a predetermined value.

6. The power supply device for vehicle according to claim 1, wherein on the occasion of charging a battery with an electric power having been stored in the capacitor during the second predetermined time period, the second predetermined time period T2 is made shorter by causing an output current from said DC/DC convertor to be larger.

7. The power supply device for vehicle according to claim 1, wherein on the occasion of charging a battery with an electric power having been stored in a capacitor during the second predetermined time period, the second predetermined time period T2 is made longer by causing an output current from said DC/DC convertor to be smaller.

8. The power supply device for vehicle according to claim 1, further comprising a forced discharge circuit connected to said capacitor or DC/DC convertor thereby forcing an electric power having been stored in said capacitor to discharge,
wherein an electric power having been stored in said capacitor is forced to discharge until the voltage of the capacitor is substantially equal to a predetermined voltage using said forced discharge circuit in the case that the voltage of the capacitor is not less than a predetermined voltage for the third predetermined time period T3 after the second predetermined time period T2 has passed.

9. The power supply device for vehicle according to claim 8, wherein a radiator is provided at said DC/DC convertor and said forced discharge circuit is connected to said DC/DC convertor, and
said radiator functions to perform heat radiation of both the generated heat of said DC/DC convertor and the generated heat of the forced discharge circuit.

10. The power supply device for vehicle according to claim 1, further comprising:
a forced discharge circuit configured to force the capacitor to discharge the stored electric power, in response to the signal from the capacitor voltage detection circuit indicating that the voltage of the capacitor exceeds the predetermined voltage after the capacitor has charged the battery during the second predetermined time period T2.

11. The power supply device for vehicle according to claim 10, wherein the forced discharge circuit is further configured to force the capacitor to discharge the stored electric power until the voltage of the capacitor becomes substantially equal to the predetermined voltage.

12. The power supply device for vehicle according to claim 1, wherein the capacitor voltage detection circuit is connected to the capacitor and configured to monitor whether the voltage of the capacitor becomes substantially equal to or less than the predetermined voltage, during the first operational mode, and
the power supply control circuit is configured to interrupt a supply of the electric power stored in the capacitor to the load and cause a self-discharge of the capacitor, in the first operational mode.

13. The power supply device for vehicle according to claim 1, wherein the capacitor voltage detection circuit is connected to the capacitor and is configured to monitor whether the voltage of the capacitor becomes substantially equal to or less than the predetermined voltage during the second operational mode, and
the power supply control circuit is configured to interrupt a supply the electric power stored in the capacitor to the battery and to cause the self-discharge of the capacitor, in the second operational mode.

14. The power supply device for vehicle according to claim 1, wherein the SOC calculation circuit is connected to the battery and configured to calculate a charge amount remaining in the battery, and
the power supply control circuit is configured to maintain the charge amount in the battery at a reduced level prior to a start of the second operational mode.

* * * * *